Patented May 2, 1933

1,907,380

UNITED STATES PATENT OFFICE

JEAN BAER, OF BASEL, SWITZERLAND

MANUFACTURE OF RESINOUS PLASTIC BODIES

No Drawing. Application filed June 16, 1930, Serial No. 461,639, and in Germany June 24, 1929.

I have found that if polysulphide solutions as for example solutions of calcium, potassium and like polysulphides are heated with tall oil, that is the by-product in the production of cellulose from pine wood, there occurs a solidifying of the tall oil so that resinous, non-sticky, plastic bodies are obtained which are soluble in various solvents, as for example carbon disulphide, chloroform, ethylene chloride, benzol etc. These bodies are particularly suitable as a packing material, as a caulking material for ships, as a substitute for resins, and for the most varied purposes in the rubber industry.

*Example*

To 100 parts by weight of a calcium polysulphide solution of 1.07 sp. gr., are added 6 parts of the above said tall oil and the mixture raised to boiling point, when the tall oil after first foaming, is transformed in a short time into a plastic, non-sticky, resinous, transparent body.

In this example, any other alkali or earth alkali polysulphide solution can be used.

What I claim is:—

A process for producing resinous, plastic bodies, consisting in heating solutions of alkali or alkali earth metal polysulphides with tall oil.

In witness whereof I have hereunto signed my name this sixth day of June 1930.

JEAN BAER.